April 14, 1931.  A J. MERKLE  1,800,557
SILENT DRIVE CHAIN
Filed Nov. 10, 1928

INVENTOR,
Arthur J. Merkle
Howard S. Smith,
His ATTORNEY

Patented Apr. 14, 1931

1,800,557

UNITED STATES PATENT OFFICE

ARTHUR J. MERKLE, OF DAYTON, OHIO

SILENT DRIVE CHAIN

Application filed November 10, 1928. Serial No. 318,342.

This invention relates to new and useful improvements in silent drive chains.

It is a principal object of my invention to provide for the purpose of transmitting power from one sprocket wheel to another, a silent drive chain which has few parts and is simply and sturdily constructed. It also works efficiently on sprocket wheels operating at a high rate of speed without stretching, buckling or whipping.

Other important and incidental objects will be brought out in the following specification and particularly set forth in the subjoined claims.

Figure 1:
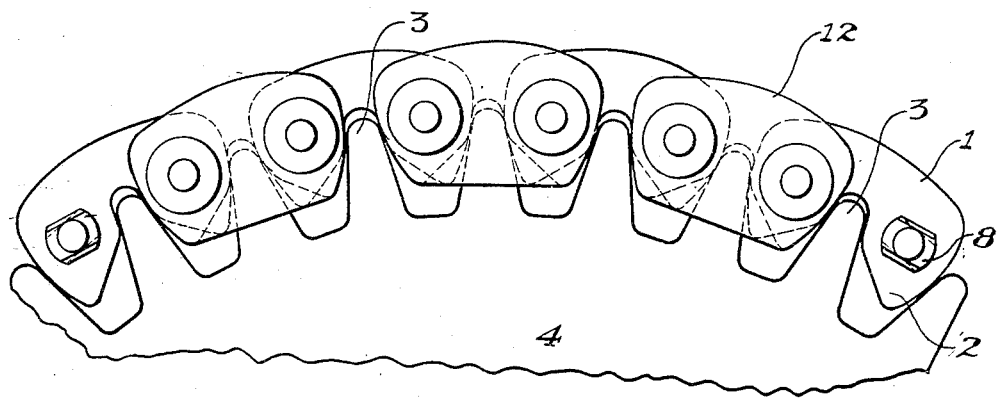
Figure 2:
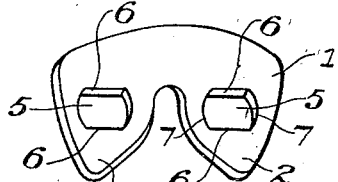
Figure 3:
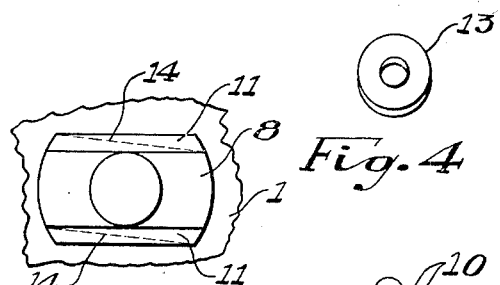
Figure 4:
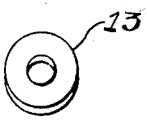
Figure 5:
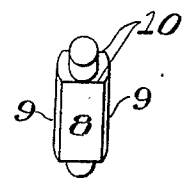

Referring to the accompanying drawings, Figure 1 is a side view of a portion of the chain on a broken section of a sprocket wheel. Figure 2 is a perspective view of a working link. Figure 3 is a side view of a broken section of a link with an end view of a pintle in a hole in the link. Figure 4 is a perspective view of a washer. And Figure 5 is a perspective view of a pintle.

In the accompanying drawings illustrating my invention, the numeral 1 designates a working link of my chain. The ends and lower edge of this link are shaped to form a pair of teeth 2 to engage the sprockets 3 of a wheel 4 as shown in Figure 1.

An opening 5 is formed in each end of the link 1, with its center in a plane having all of its points equidistant from the corresponding points of two adjacent sprockets when the link 1 is in engagement with those sprockets. The opening 5 has two straight opposite sides 6, 6 parallel to each other. These sides coincide with the line of travel of the chain when it is moving in a straight line and are tangent to its arc of travel at the center point of the sides when the chain is in engagement with a sprocket wheel. The curved sides 7, 7 of the link are arcs of a circle passing through the ends of the sides 6, 6. (See Figure 2.) Therefore, the openings 5 in the links have opposite concave side walls and opposite parallel straight walls.

A connecting pintle 8 has two opposite sides 9, 9 shaped after the fashion of the sides 7, 7 of the opening 5 in a link 1 for movably engaging these sides. The two remaining sides 10, 10 of the pintle are straight and parallel as shown in Figure 3, with their respective points equidistant from its axis which coincides with the center of the opening 5. Since the sides 10, 10 of the pintle 8 do not engage the sides 6, 6 of the opening 5, spaces 11, 11 are left between these sides which change in shape and size as the link 1 turns on the pintle.

Guide links 12 are carried on the ends of the pintle for keeping the chain on the sprockets to enable it to track properly. These links are similar in size and shape to the working links 1, with the exception that they are not formed with teeth. (See Figure 1.)

To hold it in the links I reduce the ends of each pintle to a uniform cylinder having a diameter equal to the shortest distance between its sides 10, 10, as shown in Figure 5, for receiving a washer 13. The latter is secured on the pintle by riveting that portion of the end of the pintle which projects through the washer.

In assemblying the parts, a series of working links are placed with their sides adjacent each other and another series arranged similarly. The ends of the links of both series alternately overlap so that the opening in each end of each link registers with the opening in the end of an adjacent overlapping link for receiving the pintle 8. Both ends of the latter project sufficiently beyond the said links to receive a guide link 12. Then washers 13, as above described, are riveted on the ends of the pintle to hold the links in their proper place.

In operation, when the links are traveling in a straight line the spaces 11, 11 assume the shape shown in Figure 3. But when they are moving in engagement with a sprocket these spaces change to a shape similar to those in Figure 3 as indicated by the dotted line 14 and the flat sides of the link 1. Due to the constant change in size and shape of these spaces during operation, they serve efficiently for forcing oil between the working parts. When the sides are parallel as described, the space 11 has the greatest capacity. While attaining this increased capacity, there is created therein for an instant a vacuum which is sufficient to draw oil from the adjacent working parts into this space. When decreasing in size as the links engage a sprocket, the oil is forced out of the space to again lubricate the moving parts.

This feature gives a continual movement of oil between the operating parts, which cannot be had in chains comprising links connected by cylindrically shaped pins without employing additional means.

The rounded sides of the pintles fit closely against the convex sides of the holes, thereby preventing any stretch of the chain.

In construction, the links and washers can be stamped from sheet metal by progressive dies. The pintles are made from rounded stock having two flat sides, so that only the ends require turning to prepare the pintles for assembly.

The guide links can be made from heavier stock than that employed in making the working links so as to increase the strength and efficiency of the chain. If desired, the guide links as above described may be omitted from the assembled chain and in their place one link may be mounted on the pintles between two of the working links to be received in a longitudinal groove on the sprockets for serving the same purpose as the guide links carried on the ends of each pintle.

Since it is only possible for the links to partially turn on the pintles because of the flat sides, the chain can not buckle in operation.

I do not desire to limit myself to the details of construction and arrangement herein shown and described and any changes or modifications may be made therein within the scope of the subjoined claims.

Having described my invention, I claim:

1. In a chain of the silent link type, a plurality of overlapping links having registering circular openings with two flat straight sides equidistant from each other throughout their lengths, and articulating pintles disposed in said openings in movable engagement with the opposite concave side walls thereof for the purpose specified.

2. In a chain of the silent link type, a plurality of overlapping links having registering circular openings with two flat straight sides equidistant from each other throughout their lengths, and articulating pintles formed with opposite concave sides and opposite parallel sides, disposed in said openings for the purpose specified.

3. In a chain of the silent link type, a series of overlapping links, each link formed with two circular openings, for registry with the openings of other links of said series, each opening having two flat straight sides equidistant from each other throughout their lengths, an articulating cylindrical pintle movably engaging the walls of registering openings in the links and having two flat parallel sides for leaving spaces between it and the parallel sides of the openings in the links for the purpose specified.

4. In a chain of the silent link type, a series of overlapping links, each link formed with two openings, for registry with the openings of other links of said series, each opening formed with opposite concave side walls and opposite continuously straight parallel walls, a pintle formed with opposite convex sides for movably engaging the concave side walls and opposite flat parallel sides of each opening to leave spaces between said pintle and the parallel sides of the openings in the links for the purpose specified.

In testimony whereof I have hereunto set my hand this 6th day of November, 1928.

ARTHUR J. MERKLE.